United States Patent Office 3,446,795
Patented May 27, 1969

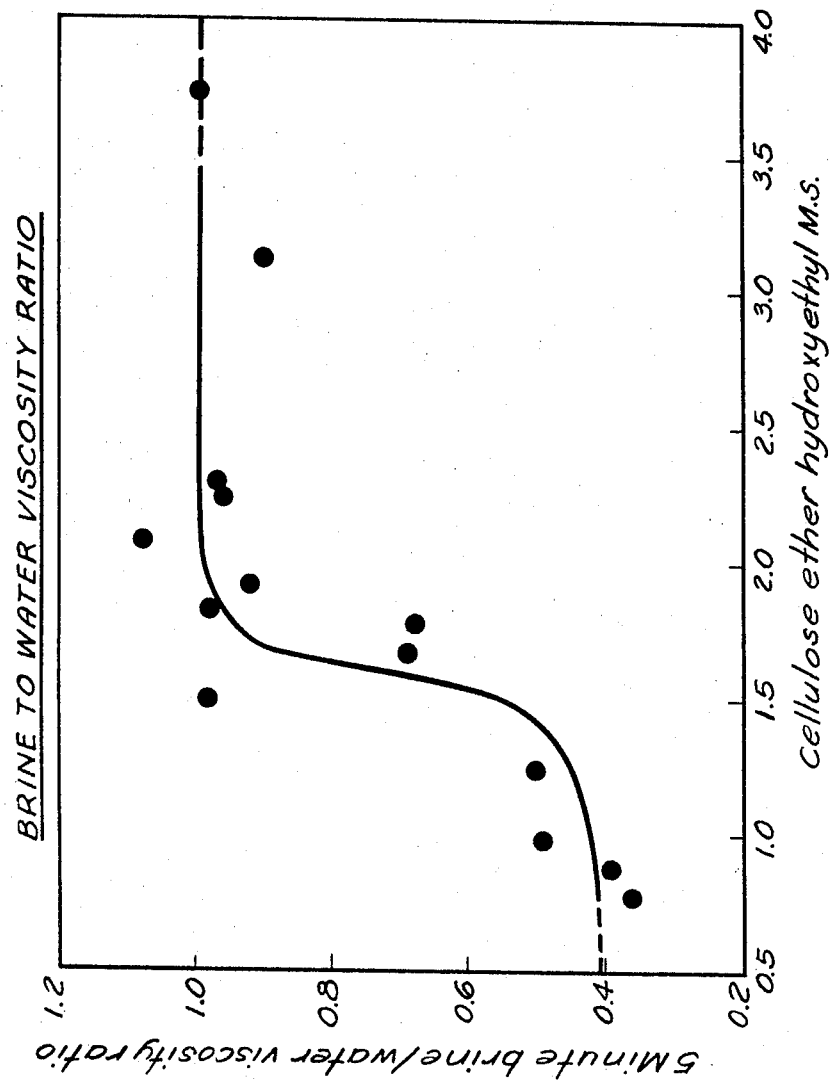

3,446,795
MIXED CELLULOSE ETHERS
Joseph R. Boudreaux, Plaquemine, and Reginald F. Roberts, Jr., Baton Rouge, La., assignors to The Dow Chemical Company, Midland, Mich., a corporation of Delaware
Filed Apr. 16, 1965, Ser. No. 448,608
Int. Cl. C08b *11/02;* E21b *43/25*
U.S. Cl. 260—231                                    3 Claims

ABSTRACT OF THE DISCLOSURE

Cellulose ethers of improved brine tolerance are mixed carboxyalkyl-hydroxyalkyl celluloses characterized by a carboxymethyl MS from about 0.2 up to about 1.2 and a hydroxyalkyl MS of at least about 1.5 up to about 5, preferably a carboxymethyl MS of about 0.3 to about 0.5 and hydroxyalkyl MS from about 1.8 to about 3. These ethers have a solution rate in brine nearly as rapid as their solution rate in water. They are especially useful as additives to well treating fluids.

---

The present invention concerns novel mixed carboxyalkyl hydroxyalkyl cellulose ethers and methods for their preparation and use.

It is known to prepare certain carboxyalkyl hydroxyalkyl cellulose ethers. For example, Klug, in U.S. Patent 2,618,632, teaches the preparation of such ethers. Specifically, Klug teaches mixed cellulose ethers containing from about 0.2 up to about 0.9 carboxymethyl group and 0.15 to about 0.75 hydroxyethyl group per anhydroglucose residue unit. These ethers are described as being soluble in brines and aqueous acids.

Although the mixed cellulose ethers taught by Klug are soluble in an aqueous brine, their rates of dissolution in the brine are slow as compared to their rates of dissolution in water. On occasion, the rate of dissolution in brine may be as low as 50 percent, or less, of the dissolution rate of the ether in water.

A number of operations utilize a cellulose ether in an aqueous brine. In such instances, retarded brine solubility of the ether can be most disadvantageous. One such operation is in the fracturing of oil-bearing formations employing a brine based fracturing medium. It is conventional to incorporate a particulate propping agent into the fracturing fluid. To maintain the propping agent in suspension and to reduce fluid losses to the formation being fractured, the fracturing medium is often modified with a polymeric additive such as a cellulose ether.

It is standard practice to formulate the fracturing fluid as it is being injected into the formation. Due to the high rates of fluid injection used in the process, the rate of dissolution of the ether, or in other terms, the time elasped from introduction of the ether to the attainment of the desired hydration is critical to the successful utilization of the ether as a fracturing fluid additive.

It is therefore desirable to provide a cellulose ether suitable for thickening aqueous brines having an improved dissolution rate in the brines. A further object of the invention is the provision of a novel cellulose ether finding application in any of a wide variety of thickening functions wherein brine tolerance and rate of dissolution are important. A further need is to provide a cellulose ether characterized by good fluid-loss properties. The foregoing, and other desiderata, as will be pointed up in the following description of the mixed cellulose ethers of the invention, are accomplished in the present invention.

The novel mixed cellulose ethers of the invention are water-soluble, mixed, carboxyalkyl-hydroxyalkyl cellulose ethers wherein the etherifying groups contain from two to three carbons. The ethers are characterized by a carboxyalkyl MS of from about 0.2 up to about 1.2 and a hydroxyalkyl MS of at least about 1.5 up to about 5. Such cellulose ethers are water-soluble and non-thermogelling. They can be prepared in viscosity grades (measured as 0.4 percent by weight solutions of the ether in water) ranging from as little as 1 centipoise up to as much as 200 centipoises. For most uses, it is preferred that the ethers have a solution viscosity of at least 40 centipoises.

The viscosity measurements referred to above are made with a Fann V.G. viscosimeter operated at 100 r.p.m. on solutions at 25° C. The abbreviation MS following a substituent moiety refers to the average number of moles of that substituent attached, directly or indirectly through a side chain, to each anhydroglucose residue unit of the ether. If the moiety is directly attached, it replaces a hydrogen on one of the available hydroxyls of the cellulose itself. Indirect attachment occurs when the moiety replaces a hydrogen on a side chain itself attached to the cellulose. Such a side chain is produced by the etherification of the cellulose hydroxyls with an alkylene oxide.

The ethers described above are also characterized by dissolution rates in brine approximating their dissolution rates in water. As a result of this property, the ethers have a superior utility as additives to fracturing fluids based upon aqueous brines.

A preferred mixed ether of the invention is carboxymethyl hydroxyethyl cellulose characterized by a carboxymethyl MS within the range of from about 0.3 to about 0.5 and a hydroxyalkyl MS within the range from about 1.8 to about 3.

The ethers are prepared by first reacting alkali cellulose, in any order, with suitable amounts of a halogenated lower carboxylic acid and a hydroxy-alkylating reagent. By alkali cellulose is meant the reaction product of cellulose and an alkali metal hydroxide or quaternary ammonium base. Specific examples are sodium hydroxide, potassium hydroxide, and trimethyl benzyl ammonium hydroxide. Useful lower acids include monochloroacetic acid, monochloropropionic acid, and alkali metal salts of the foregoing acids. Suitable hydroxyalkylating agents include the lower alkylene oxides such as ethylene and propylene oxides. Such oxides can be formed in situ by reaction of the appropriate chlorohydrins with an alkali hydroxide.

The alkali cellulose may be prepared prior to the etherification reaction, or prepared in situ by incorporating cellulose and an alkali hydroxide into the reaction system along with one or more of the etherifying reagents. Reaction techniques of this nature are taught in U.S. Patents 2,469,764 and 2,510,355. If desired, however, etherification of the alkalized cellulose can be carried out in the presence of an inert diluent, which promotes uniform distribution of the reactants, a condition otherwise obtained by vigorous stirring of the reaction system. Illustrating such a technique are U.S. Patents 2,067,946; 2,517,577; 2,572,037; 2,839,526; and 3,131,176.

Cellulose fibers suitable for preparing the ethers of the invention include any appropriate cellulose raw materials such as cotton or wood pulp of a type conventionally used for etherification reactions. Such cellulose material may be used in any physical form such as bulk fibers, cellulose fiber sheets, mechanically sub-divided or flocked cellulose fibers or ground cellulose fibers. Cotton linters are preferred.

Regardless of the particular reaction technique employed to prepare the ether of the prescribed composition, the reaction product must be recovered essentially as follows. To make a particulate and soluble product, and one which may be further reduced in particle size as by grinding, the reaction mass is dried to reduce its moisture content below about 25 weight percent. In addition, the drying removes reaction by-products evolved during the reaction and any inert diluent that may have been incorporated into the reaction mixture.

Due to the nature of the etherifying substituents and the relative proportions thereof in the desired ether product, auto-esterification of the mixed ether may occur upon drying or later storing of the reaction mass. To minimize these problems, it is considered desirable to successful practice of the invention to accomplish drying of the ether product in the presence of a base and thereafter maintain the ethers in the presence of such base until used.

Preferably, drying of the basic product is accomplished below 140° F., but in any event below about 200° F. The amount of base present prior to initiation of the drying step should be between about 0.1 percent and 4 percent by weight of the reaction mass. Preferably, the amount thereof is between 0.5 percent and 1.5 percent by weight of the reaction mass.

Drying in the presence of a base is contrary to the usual practice in the art whereby the etherification reaction product is first neutralized prior to drying to minimize the degradative effects of oxygen on alkaline ethers. The alkaline degradation may not be completely avoided in the present invention, but it is effectively obviated by drying the ether below about 200° F.

In a preferred embodiment of the invention, a mixed carboxymethyl-hydroxyalkyl cellulose ether is prepared according to a stagewise mass-reaction technique. A cellulose fiber stock suitable for the preparation of cellulose ethers is incorporated into a reactor equipped with means for inducing severe agitation of the reaction mass. Cotton linters are a good starting material for this reaction but ground wood cellulose can also be used to advantage. Illustratively, suitable mixing is accomplished by introducing rotary as well as beating motion into the reaction mass. This is accomplished with counter-rotating turbines and double-helical agitators. Along with the cellulose is incorporated an alkali hydroxide such as sodium hydroxide, potassium hydroxide or a quaternary ammonium compound. Usually the base is in an aqueous solution as concentrated as is convenient for spraying it onto the cellulose fibers. At this point, if this has not already been done, the reactor is evacuated to remove oxygen. Thereafter, the carboxyalkylating reagent (e.g., chloroacetic acid) is incorporated into the alkalized reaction mass in an amount sufficient to provide a carboxyalkyl MS from about 0.05 up to about 0.2. The hydroxyalkylating reagent is then introduced in an amount sufficient to produce a hydroxyalkyl substitution of at least about 1.5 up to as much as about 5. The carboxyalkylating reagent is again added in an amount sufficient to produce a product with a total carboxyalkyl MS in the range of about 0.2 up to 1.2. The additions of the etherifying reagents are accomplished at reactor temperatures within the range from about 30° C. to about 80° C.

The reaction mass is then dried as a basic product at a temperature below about 140° F. to a residual moisture content of less than about 25 percent, preferably to less than about 16 percent, by weight of the reaction mass. The dried product may then be ground, if a finer particulate form is desired.

Although the ethers of the invention have high dissolution rates in brines relative to their dissolution rates in water, the dissolution rate for any particular ether can be increased by decreasing the particle size of the ether. Thus, for utilization in fracturing fluids, the ethers should be comparatively finely ground. Good results are achieved with ethers employed in this use having a particle size small enough to pass a 60 mesh screen of the United States Standard screen series.

The following examples further illustrate the invention. Among the variables illustrated is the dependence of the relative dissolution rates of the ethers in water and brine with reference to the hydroxyalkyl MS of the ether. The unique ethers are further shown to be prepared in a wide range of carboxyalkyl substitutions by any one of several preparative modes.

EXAMPLE 1

To a vigorously stirred reactor agitated by means of a counter-rotating-turbine beater was added a quantity of cotton linters. The reactor was evacuated to a residual pressure of about 10 millimeters of mercury. After purging the reactor with nitrogen, the linters were sprayed with a 50 percent by weight aqueous solution of sodium hydroxide. Enough sodium hydroxide was used to provide about 0.33 pound thereof per pound of dry cotton linters. Monochloroacetic acid was then sprayed onto the agitated reaction mass. Sufficient acid was added to produce a lightly carboxymethylated ether having a carboxymethyl substitution of about 0.04 MS. Thereafter, ethylene oxide was supplied to the reactor until about 1.9 moles thereof had reacted per mole of cellulose to produce an ether with a hydroxyethyl MS of 1.9. At this point, additional chloroacetic acid was introduced to give a total carboxymethyl substitution of about 0.4 MS.

The product thus prepared contained about 0.4 percent by weight residual sodium hydroxide. It was dried at about 135° F. to a residual moisture content of about 10 weight percent of the reaction mass. The product thus obtained was characterized by water solubility and stable viscosity properties upon storage in the dry state.

In a manner similar to that employed above, a series of mixed carboxymethyl-hydroxyethyl cellulose ethers was prepared with different carboxymethyl MS and hydroxyethyl MS values. Each ether was evaluated to determine its dissolution rate in brine relative to its dissolution rate in water. The ratio of these two dissolution rates is considered to be an indication of the brine tolerance of the ether.

Specifically, the dissolution rates of the ethers were determined by placing them in a solvent medium contained in a stirred vessel. The solvent medium was either water or a standard brine composed of 8 percent by weight sodium chloride and 2.5 percent by weight calcium chloride in water. The ether sample to be evaluated was added to the stirred solvent medium in an amount equivalent to 60 pounds of the ether per 1000 gallons of the solvent. The viscosity buildup in the resulting dispersion was measured over a series of time intervals, immediately following dispersion of the sample, with a Fann V.G. viscosimeter operated at 100 r.p.m. Three drops of tributyl phosphate were added to the dispersion to minimize foaming. Viscosity readings taken five minutes after dispersion of the samples in each water and brine were utilized to compute the ether dissolution rate in brine relative to that in water, i.e., the five-minute brine/water viscosity ratio.

The results of the foregoing measurements for a series of ethers totaling 14 separate ether products having a comparable carboxymethyl MS within the range from 0.32 up to 0.57 is plotted in the accompanying drawing as a function of hydroxyethyl MS. Consideration of this graph reveals a most surprising and beneficial aberration in the brine tolerance of mixed carboxymethyl-hydroxyethyl cellulose ethers at a hydroxyethyl MS of about 1.5. Moreover, it is believed that this value is essentially independent of the relatively minor variations in the carboxymethyl MS of the plotted ethers.

EXAMPLE 2

A number of carboxymethyl-hydroxyethyl cellulose ethers were prepared in a manner similar to that of Example 1 at several levels of carboxymethyl substitution. At each level of carboxymethyl substitution, one ether was prepared with a hydroxyethyl MS of at least about 1.5 and another with a hydroxyethyl MS less than 1.5. The five-minute brine/water viscosity ratios, determined according to the above-described method, along with specifications of the ether composition evaluated, are shown in the following table.

TABLE

| Run No. | Carboxymethyl MS | Hydroxyethyl MS | 5 minute brine/water viscosity ratio |
|---|---|---|---|
| 1A | 0.32 | 0.79 | 0.36 |
| 1B | 0.26 | 1.66 | 0.98 |
| 2A | 0.37 | 1.00 | 0.50 |
| 2B | 0.40 | 1.50 | 0.98 |
| 3A | 0.44 | 1.28 | 0.48 |
| 3B | 0.43 | 1.86 | 0.96 |
| 4A | 0.89 | 1.45 | 0.48 |
| 4B | 0.89 | 1.69 | 0.88 |

EXAMPLE 3

Essentially comparable mixed carboxymethyl-hydroxyethyl cellulose ethers can be prepared employing different reaction techniques. In one mode different from the preferred one of Example 1, cotton linters were incorporated into a turbine-stirred reactor with dual counter-revolving turbine blades. After purging with nitrogen, the cotton linters were sprayed with a 50 percent aqueous solution of sodium hydroxide in an amount to provide about 0.33 pound of the caustic per pound of the cellulose fibers. The alkaline cotton was then sprayed with monochloroacetic acid in an amount sufficient to produce an ether with a carboxymethyl MS of 0.38. At this point, ethylene oxide was introduced into the reactor in amount sufficient to produce a hydroxyethylation MS of 2.08. The resulting product, which contained excess alkali, was dried over a temperature range of about 150 to 180° F. and recovered as finely divided particulate solid.

The relative five-minute brine/water viscosity ratio of the ether prepared by the above two-stage process was 1.08.

In a manner similar to the etherification techniques employed above, previously prepared alkali cellulose containing from about 0.3 to about 0.4 pound of the alkali per pound of cellulose is employed in place of the cotton linters and aqueous caustic charged in the foregoing reactions to produce comparable mixed ethers. If desired for greater uniformity of reaction, the reaction mass, or a portion thereof, may be dispersed or dissolved in an inert liquid which promotes uniform distribution of reactants.

Regardless of the reaction technique used, however, the ethers must be dried as basic compositions. On occasion, when too little alkali remains in the reaction mass, additional alkali may be incorporated at the end of the reaction to increase the basicity of the reaction mass to within desirable limits for the subsequent drying step. The base incorporated at this point may be any alkali-metal hydroxide, alkali-metal carbonate, or quaternary ammonium compound. Enough is added to bring the total base up to at least about 0.1 percent by weight of the reaction mass.

EXAMPLE 4

The following illustrates the application of the mixed carboxyalkyl-hydroxyalkyl cellulose ethers of the invention in fracturing fluid-bearing geological formations.

A fracturing fluid is prepared from an aqueous brine. This brine is mixed with a finely divided propping agent, e.g., about 2 pounds of 20 to 40 mesh sand per gallon of fluid. Simultaneously within the incorporation of the propping agent, a brine-tolerant ether of the present invention is incorporated into the fracturing fluid in an amount sufficient to provide about 0.06 pound thereof per gallon of the fracturing fluid. The ether is used primarily as an aid to reduce water loss into the formation being treated. Mixing of the ingredients into the liquid medium is accomplished at the well-head with conventional equipment. The mixture is then injected into the formation to be fractured through a well penetrating that formation under an elevated pressure sufficient to fracture the formation. As the pressure on the fracturing medium is increased at the well-head, a break-through or fracture is evidenced by a pronounced dropping off of pressure at the well-head. At this time, sufficient pressure is applied to achieve a continual fluid injection rate of 10 to 20 barrels per minute. After a period of 3 to 30 minutes, the well is flushed with additional brine containing just the ether additive. In this manner, the well is fractured and a propping agent deposited in the fractures to enhance oil recovery from zones substantially removed from the oil-well bore hole.

What is claimed is:

1. The method for the preparation of a mixed carboxyalkyl-hydroxyalkyl cellulose ether wherein the carboxyalkyl and hydroxyalkyl groups each have from two to three carbons, and the ether is characterized by a carboxyalkyl MS within the range from about 0.2 up to about 1.2 and a hydroxyalkyl MS within the range from about 1.5 up to about 5, which method comprises reacting cellulose with an alkali hydroxide, a chlorinated carboxylic acid having from two to three carbons and an alkylene oxide having from two to three carbons to form a water-soluble mixed carboxyalkyl-hydroxyalkyl ether as characterized above, and drying said ether in the presence of from about 0.1 to about 3 percent of alkali, based on the weight of the reaction mass at a temperature less than about 200° F.

2. The method as in claim 1 wherein the alkali used is sodium hydroxide.

3. The method as in claim 1 wherein a portion of the total chlorinated carboxylic acid used is reacted with the alkalized cellulose prior to the addition of the alkylene oxide to provide an intermediate carboxymethyl cellulose with a carboxymethyl MS within the range of about 0.05 to about 0.2.

References Cited

UNITED STATES PATENTS 3,284,353  11/1966  Batdorf et al. _____ 252—8.5
2,618,595  11/1952  Gloor _____ 252—8.5

DONALD E. CZAJA, *Primary Examiner.*

R. W. MULCAHY, *Assistant Examiner.*

U.S. Cl. X.R.

252—8.5, 8.55